Dec. 5, 1950  W. H. SILVER ET AL  2,532,577
DETACHABLE POWER UNIT FOR PLOWS
Filed Nov. 30, 1945

INVENTOR.
WALTER H. SILVER
JOHN I. CANTRAL
ATTORNEYS.

Patented Dec. 5, 1950

2,532,577

UNITED STATES PATENT OFFICE 2,532,577

DETACHABLE POWER UNIT FOR PLOWS

Walter H. Silver and John I. Cantral, Moline, Ill., assignors to Deere & Company, Moline, Ill., a corporation of Illinois Application November 30, 1945, Serial No. 632,074

18 Claims. (Cl. 97—50)

The present invention relates generally to agricultural implements and more particularly to implements having a part or parts to be raised and lowered by power.

The object and general nature of this invention is the provision of new and improved raising and lowering connections particularly adapted for use with a detachable power unit, such as a hydraulic piston and cylinder device connected with the tractor so as to form a normally permanent part thereof and easily and quickly removable from the implement whenever the tractor is unhitched from the implement. More specifically, it is an important feature of this invention to provide for locking the implement part in its raised position, so as to hold the part in that position even when the power operated raising unit is detached from the implement, in connection with new and improved connections making it possible to relax the operating pressures in the power unit so as to facilitate the quick detachment thereof from the implement.

A further feature of this invention is to provide locking means for holding the shiftable implement part in a given position, which locking means acts through at least a portion of the raising and lowering connections which serve to transmit the raising and lowering movement from the power unit to the shiftable implement part when the power unit is mounted on the implement and operated to shift said implement part from one position to another.

These and other objects and advantages of the present invention will be apparent to those skilled in the art after a consideration of the following detailed description, taken in conjunction with the accompanying drawings in which one form of the present invention has been shown by way of illustration.

Figure 1:
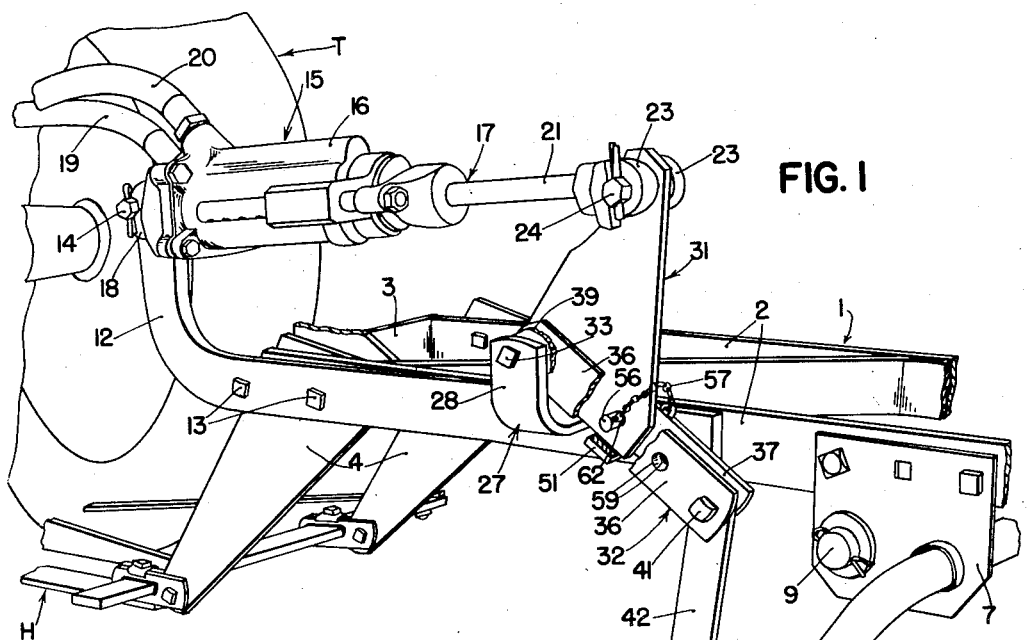
Figure 1 is a perspective view of a wheel supported tractor plow having one or more crank axles swingable by power into and out of positions providing for raising the plow frame into a transport position and lowering the frame therefrom into an operating position.

Referring now to the drawings, the frame of the plow is indicated by the reference numeral 1 and comprises one or more plow beams 2 extending in a generally longitudinal direction and connected at their forward ends by suitable cross braces 3. Also secured to the front ends of the beams 2 are hitch brackets 4. A part in the form of a land wheel crank axle 5 is journaled for rocking movement about a transverse axis in pairs of bearing brackets 7 bolted or otherwise secured to the plow beams 2. One end of the crank axle 5 extends forwardly and includes a cranked portion which receives the land wheel 8. The crank axle 5, together with the furrow wheel crank axle 9 and furrow wheel connections (not shown), normally operate together for raising and lowering the plow frame.

In order to provide for power operation of the crank axle 5 and associated parts, we provide a forwardly and upwardly extending cylinder-receiving bracket 12 that is fixed, as by bolts 13, to the landward beam 2. The upper end of the bracket 12 is apertured to receive a quick detachable pin 14 by which a hydraulic piston and cylinder unit 15 may be connected to the implement. The particular details of the hydraulic unit 15 do not per se form a part of the present invention but for purposes of illustration we have shown a cylinder section 16 and a piston section 17, the cylinder section 16 having a pair of apertured lugs 18 which receive the pin 14 and are disposed on opposite sides of the upper end of the bracket 12. A pair of hose lines 19 and 20 are connected to the cylinder section 16 so as to provide for the delivery of fluid under pressure to one end of the cylinder and withdrawal of fluid from the other end, optionally. The outer or rear end of the piston rod 21 that forms a part of the piston section 17 is provided with a pair of apertured lugs 23 which receive a rear quick detachable pin 24.

The bracket 12 is extended rearwardly alongside the landward beam 2 and is secured at its rear end, as by bolts (not shown), to the beam 2. A generally U-shaped bracket 27 having apertured upturned portions 28 is secured, as by welding, to the rear portion of the bracket 12. A pair of arm members 31 and 32 are swingably mounted on a pin or bolt 33 carried by the bracket sections 28. Preferably, the arm member 31 comprises a plate-like section, generally triangular in configuration and apertured at its upper end to detachably receive the quick detachable pin 24. The other arm member 32 comprises a pair of straps or bars 36 and 37 which are spaced apart to receive the arm member 31 therebetween. Either or both of the forward ends of the strap members 36 and 37 carries or is formed with bearing extensions 39 providing adequate support of the members 36 and 37. Preferably, but not necessarily, the arm members 31 and 32 are swingably mounted on a bushing or other bearing member mounted on the bolt 33. The arm members 36 and 37 are apertured at their rear ends to receive a pivot bolt 41 by which a link 42 is pivotally connected therewith, and the lower end of the link 42 is apertured to receive a pivot bolt 44 by which the link 42 is connected to a lug 45 that is fixed, as by welding, to the crank axle 5. Preferably, the lug 45 is provided with several apertures 46 so that the position of the pin 44 in the lug 45 may be varied. The power unit 15 preferably is of the type that has a predetermined stroke or extension, the same being shown in its extended position in Figure 1. Therefore, when extended, the position of the crank axle 5 relative to the frame 1 may be adjusted by disposing the pivot bolt or pin 44 in any one of the several openings 46 in the lug 45.

Figure 2:
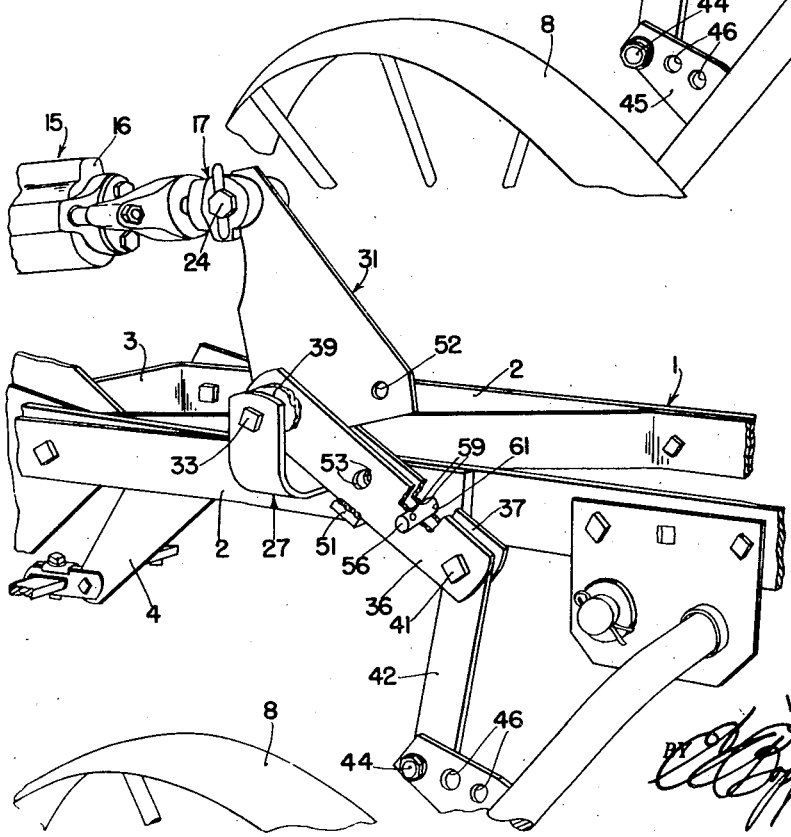
Figure 2 is a fragmentary view, similar to Figure 1, showing certain of the operating connections in the positions they occupy when the plow is locked in its raised position and the power device in a position to be detached therefrom.

A bar 51 is secured, as by welding, to the lower edges of the two arm members 36 and 37 and serves as a stop for limiting the rearward swinging of the upper arm member relative to the lower arm member 32. When the member 31 engages the stop 51, an opening 52 (Figure 2) in the arm member 31 comes into registry with a pair of openings 53 formed in the arm members 36 and 37. Preferably, the opening 52 is slightly larger than the openings 53. A pin 56 may be placed in the openings 52 and 53, when in registry, so as to lock the arm members 31 or 32 together. The pin 56 is connected by a chain 57 to the strap member 37 so that there is no l'kelihood of the pin 56 being lost. The chain 57 is of sufficient length to provide for placing the pin 56 in a second set of openings 59 in the strap members 36 and 37 and in an opening 61 formed in a part of the plow frame 1, preferably in the rearmost portion of the bracket 12. Preferably, the chain 57 also carries a cotter 62 or some other fastener for holding the pin 56 in either of its positions.

In operation, when the parts are arranged as shown in Figure 1, the piston section 17 of the un't 15 may be extended or retracted for raising or lowering the plow frame relative to the ground wheels, thereby raising or lowering the tools into and out of operating and transport positions. When it is desired to disconnect the implement from the tractor T a hitch connection H, which includes detachable hitch means, is disconnected, either before or after the power device 15 has been operated to extend the piston section 17 the full amount, thereby bringing the openings 59 into registry with the opening 61 in the frame, it being understood that during operation, the pin 56 is disposed in the registering openings 52 and 53 since the weight of the frame and associated parts normally holds the stop 51 up against the lower edge of the arm member 31. The pin 56 may then be removed from the openings 52 and 53 and inserted into the openings 59 and 61. Then by retracting the piston section 17 a relatively small amount, the pressures on the quick detachable pins 14 and 24 may be relieved, after which such pins may be detached and the power device 15, which is normally permanently connected with the tractor through the hose lines 19 and 20, may be lifted away from the implement. However, the pin 56, being connected between the arm member 32 and the frame of the plow, acts through the arm member 32, link 42, and the lug 45, between the frame 1 and the crank axle 9 for holding the plow in its raised position, so that the frame does not collapse when disconnected from the tractor and the power device removed so as to go with the tractor and be used for other purposes. The power device 15 may be reattached by substantially the reverse of the above outlined steps. It will be noted from Figure 2 that when the arm 32 is locked to the frame 1, the other arm member 31 is free to be moved into different positions, and therefore when reattaching the power device 15, it is not necessary to have the piston section extended to any particular position. After the cylinder member 15 has been reattached, and the plow hitched to the tractor, fluid under pressure is directed to the cylinder 16 so as to extend the piston section 17 the full amount. This brings the lower edge of the plate member 31 into engagement with the stop 51 on the arm member 32, the last increment of extension of the power device 15 serving to relieve the pressure on the pin 56, in the position shown in Figure 2. Then the pin 56 may be removed from that position and reinserted into the registering openings 52 and 53, thereby reconnecting the two arm members 31 and 32, whereupon they then may serve as a bell crank transmitting the motion of the piston section 17 to the land and furrow wheel crank axles for raising and lowering the plow frame in the usual manner.

While we have shown and described above the preferred structure in which the principles of the present invention have been incorporated, it is to be understood that my invention is not to be limited to the particular details shown and described above, but that, in fact, widely different means may be employed in the practice of the broader aspects of our invention.

What we claim, therefore, and desire to secure by Letters Patent is:

1. For use with an agricultural machine having frame means and a part rockably mounted thereon, a two-way acting power device and means detachably connecting said power device with said frame means: the improvements comprising a first arm member, means swingably connecting said first arm member with said frame means, means detachably connecting the free end of said arm member with said power device, a second arm member, means swingably connecting said second arm member with said frame means about the same axis as said first arm member, means operatively connecting the second arm member with said implement part, said second arm member including stop means adapted to be engaged by said first arm member when said power device is operated in one direction, whereby swinging of said first arm member acts through said second arm member for swinging said part from one position to another, said arm members having registering apertures adapted to move into registry when said first arm member engages said stop means on said second arm member, and means insertable through said apertures and removable therefrom for detachably connecting said arm members so that the latter and said implement may be moved in either direction by operation of said power device in either direction.

2. For use in an agricultural implement including frame means, a part shiftable relative thereto, and a two-way power device detachably connected with said frame means: the improvements comprising a first arm member swingably connected with said frame means, means for detachably connecting the free end of said arm member with said power device, a second arm member swingably connected with said frame means about the same axis as said first arm member, means operatively connecting the second arm member with said implement part, said second arm member including stop means adapted to be engaged by said first arm member when said power device is operated in one direction, whereby swinging of said first arm member acts through said second arm member for shifting said part in one direction, said arm members having registering apertures adapted to move into registry when said first arm member engages said stop means on said second arm member, a part detachably insertable in said openings when they are in registry so that operation of the power device in the other direction acts to shift said implement part in the other direction, there being a second set of registering openings in said second arm member and said frame means, said last mentioned part being disconnectible from said first set of registering openings and insertable in said second set of openings when they are in registry for holding said rockable part against movement relative to the frame means and thereby accommodating detachment of said power device from the implement.

3. The invention set forth in claim 2, further characterized by said power device having a given extent of movement and said second set of registering openings being moved into registry by the operation of said power device through said extent of movement.

4. For use with an implement having a frame and a part movable relative thereto, and a two-way acting power device connected at one end with said frame: the improvements comprising a pair of members pivotally mounted on said frame, one of said members being connected with said part and the other being adapted to receive said power device, stop means acting between said members whereby the energy transmitted by said power means in one direction serves to shift said members and said implement part in one direction, there being apertures in said members adapted to come into registry when said power means is fully extended in said one direction, and pin means insertable in said registered apertures whereby operation of said power means will shift said members and said implement part in the other direction.

5. For use with an implement comprising a frame with a part movably mounted thereon, and a double-acting power device detachably connected with said frame; the improvements comprising an arm swingably connected with said frame and detachably connected to said power device, a pair of members swingably mounted on said frame and spaced apart to receive said arm therebetween and connected with said movable part, said members including a stop limiting the movement of said arm relative thereto in one direction whereby the actuation of said power device in one direction serves to shift said movable part, there being apertures in said members and said arm when the latter lies against said stop, a pin insertable in said apertures for locking said arm to said members whereby operation of said power device in the other direction serves to shift said implement part in the other direction, there also being apertures in said members and said frame arranged to come into registry when said power device is fully extended in said one direction, and locking means insertable into said apertures for holding said movable part in a given position to accommodate the removal of said locking pin and movement of said arm away from said stop, thereby providing for the unhampered removal of said power device from said implement.

6. For use with an agricultural implement having frame means and an implement part shiftable relative thereto, and a double-acting piston and cylinder unit detachably connected at one end to said frame means: the improvement which comprises a first part adapted to be shiftably mounted on said implement frame means and connected with said implement part, a second part pivotally connected with said first part and adapted to be detachably connected with the other end of said piston and cylinder unit, stop means acting between said parts for limiting relative movement therebetween in one direction, whereby operation of said piston and cylinder unit in one direction acts through said first and second parts and said stop means for shifting said implement part in one direction; detachable locking means acting between said first and second parts for preventing relative movement therebetween in the other direction, whereby operation of said piston and cylinder unit in the other direction serves to shift said implement part in the other direction, and releasable locking means adapted to act between said first part and said frame when said piston and cylinder unit has been moved through its full extent in said one direction for preventing movement of said first part relative to said frame means in the other direction, whereby the release of said detachable locking means from said first and second parts and the disconnection of said piston and cylinder unit from said frame means and said second part are facilitated.

7. For use with an agricultural implement having frame means and an implement part shiftable relative thereto: the improvement which comprises control means for said implement part, including a double-acting piston and cylinder unit, means for detachably connecting one end of said unit to said implement frame means, a first part adapted to be shiftably mounted on said implement frame means and connected with said implement part, a second part pivotally connected with said first part, means for detachably connecting the other end of said piston and cylinder unit to said second part, stop means acting between said parts for limiting relative movement therebetween in one direction, whereby operation of said piston and cylinder unit in one direction acts through said first and second parts and said stop means for shifting said implement part in one direction; detachable locking means acting between said first and second parts for preventing relative movement therebetween in the other direction, whereby operation of said piston and cylinder unit in the other direction serves to shift said implement part in the other direction, and releasable locking means adapted to act between said first part and said frame when said piston and cylinder unit has been moved through its full extent in said one direction for preventing movement of said first part relative to said frame means in the other direction, whereby the release of said detachable locking means from said first and second parts and the disconnection of said piston and cylinder unit from said frame means and said second part are facilitated.

8. For use with an agricultural implement having frame means and an implement part shiftable relative thereto, and a double-acting piston and cylinder unit detachably connected at one end to said frame means: the improvement which comprises a first part adapted to be shiftably mounted on said implement frame means and connected with said implement part, a second part pivotally connected with said first part and adapted to be detachably connected with the other end of said piston and cylinder unit, stop means acting between said parts for limiting relative movement therebetween in one direction, whereby operation of said piston and cylinder unit in one direction acts through said first and second parts and said stop means for shifting said implement part in one direction, said parts having openings therein positioned so as to be brought into registry when said stop means acts against the associated parts for limiting relative movement therebetween in said one direction, a locking pin insertable in said openings when in registry for locking said parts together, whereby operation of said piston and cylinder unit in the other direction serves to shift said implement part in the other direction, means on said first part and said frame providing a second set of openings adapted to be brought into registry when said piston and cylinder unit has been moved through its full extent in said one direction for preventing movement of said first part relative to said frame means in the other direction, whereby the release of said first pin from said first registering openings so as to provide for free relative movement between said first and second parts and the disconnection of said piston and cylinder unit are facilitated.

9. For use with an agricultural implement having frame means and an implement part shiftable relative thereto: the improvement which comprises control means for said implement part, including a double-acting piston and cylinder unit, means for detachably connecting one end of said unit to said implement frame means, a first part adapted to be shiftably mounted on said implement frame means and connected with said implement part, a second part pivotally connected with said first part, means for detachably connecting the other end of said piston and cylinder unit to said second part, stop means acting between said parts for limiting relative movement therebetween in one direction, whereby operation of said piston and cylinder unit in one direction acts through said first and second parts and said stop means for shifting said implement part in one direction, said parts having openings therein positioned so as to be brought into registry when said stop means acts against the associated parts for limiting relative movement therebetween in said one direction, a locking pin insertable in said openings when in registry for locking said parts together, whereby operation of said piston and cylinder unit in the other direction serves to shift said implement part in the other direction, means on said first part and said frame providing a second set of openings adapted to be brought into registry when said piston and cylinder unit has been moved through its full extent in said one direction for preventing movement of said first part relative to said frame means in the other direction, whereby the release of said first pin from said first registering openings so as to provide for free relative movement between said first and second parts and the disconnection of said piston and cylinder unit are facilitated.

10. An agricultural implement comprising frame means, a part shiftably mounted on said frame means for movement relative thereto, a second part shiftable relative to said first part, abutment means carried by said first part and adapted to be engaged by said second part, actuating means adapted to be connected to said second part and operative when moved in one direction to shift said first part in one direction, said parts having openings adapted to be brought into registry when said second part engages said abutment means, means insertable through said openings when they are in registry for locking said parts together, said parts being freed for movement one relative to the other when said insertable means is disconnected from said registering openings, an opening in said first part adapted to receive said insertable means in a position spaced from the position it occupies when inserted in said registering openings, and means on said frame means cooperating with said insertable means when the latter is inserted in said second opening for holding said first part against movement in one direction.

11. An agricultural implement comprising frame means, a part shiftably mounted on said frame means for movement relative thereto, a second part shiftable relative to said first part, abutment means carried by one of said parts and adapted to be engaged by the other part for limiting relative movement therebetween, actuating means adapted to be connected to said second part and operative when moved in one direction to shift said first part in one direction, said parts having openings adapted to be brought into registry when said other part engages said abutment means, means insertable through said openings when they are in registry for locking said parts together, said parts being freed for movement one relative to the other when said insertable means is disconnected from said registering openings, an opening in said first part adapted to receive said insertable means in a position spaced from the position it occupies when inserted in said registering openings, and means on said frame means cooperating with said insertable means when the latter is inserted in said second opening for holding said first part against movement in one direction.

12. An agricultural implement comprising a frame, axle means shiftably connected with said frame and adapted when shifted to raise and lower the frame, a first part connected with said axle means, a second part connected with said frame, a double-acting hydraulic unit, means for detachably connecting one end of said hydraulic unit with one of said parts, means for detachably connecting the other end of said unit with the other of said parts, including a member swingably connected with other part, stop means acting between said swingable member and said other part for preventing movement of said member relative to said other part in one direction, and releasable locking means engageable with said other part and said swingable member, when movement of the latter relative to said other part is stopped by said stop means, to prevent relative movement between said member and said other part in the other direction, and detachable means acting between said axle means and said frame for locking said axle means to said frame when said hydraulic unit is fully extended and said swingable member engages said stop means, so as to accommodate the release of said first mentioned locking means and a certain amount of movement of said swingable member in said other direction relative to said other part away from said stop means to facilitate removal of said hydraulic unit from said first and second parts.

13. An agricultural implement comprising a frame, an implement member shiftably connected with said frame and adapted to be moved from one position to another position, a first part connected with said implement member, a second part connected with said frame, a double-acting hydraulic unit, means for detachably connecting one end of said hydraulic unit with one of said parts, means for detachably connecting the other end of said unit with the other of said parts, said other part including two elements disposed in spaced apart relation, said last mentioned detachable connecting means including a member swingably connected with said other part, and disposed between said elements, a stop member connected to said elements and adapted to be engaged by said swingable member for preventing movement thereof relative to said other part in one direction, openings formed in said swingable member and said elements and adapted to be disposed in registry when said swingable element engages said stop member, and a locking part insertable in said registered openings to prevent relative movement between said swingable member and said element in the other direction, and means connected with said frame and said implement member so as to act therebetween for locking said implement member to said frame when said hydraulic unit is fully extended, thereby accommodating the release of said first mentioned locking means and a certain amount of movement of said swingable member in said other direction relative to said other part to facilitate removal of said hydraulic unit from said first and second parts.

14. In an agricultural implement, frame means, a part shiftable relative thereto, a pair of members, one connected to move with said part and the other member movable relative to said one member, stop means for limiting the relative movement of said members in one direction, an aperture in each of said members so positioned as to be in registry, when said other member is held by said stop means against movement in said one direction relative to said one member, detachable locking means insertable in said apertures when in registry for causing said one member to be moved by movement of said other member in the other direction, a double-acting power unit detachably connected with said other member and acting through said stop means and said locking means to shift said one member and said implement part in opposite directions, said power unit having a given extent of movement and adapted to act through said stop means independently of said locking means to shift said implement part in said one direction into a given position relative to said frame means, thereby accommodating the disconnection of said locking means while said power unit holds said implement part in said given position, and means including releasably connectible parts and a locking member for interconnecting said parts for anchoring said implement part to the frame so as to hold said implement part in said position and thereby accommodate an amount of movement of said power unit in the other direction sufficient to relax the pressure on the means detachably connecting the power unit in position and the incidental movement of the associated member away from said stop means, thereby facilitating the dismounting of said power unit.

15. In an agricultural implement including frame means and an implement member shiftable relative thereto from one position to another, control means for said implement member comprising a first part having a pair of spaced apertured sections connected to shift with said implement member, stop means carried by said first part, an apertured second part movable relative to said first part into a position between said sections and against said stop means, said apertures being in registry in that position of said second part, a pin insertable into said openings when in registry for locking said parts together, a double-acting power unit acting between said frame means and said second part and against said stop means for shifting said first part and said implement member in one direction into one position and against said pin means for shifting said first part and implement member in the other direction into another position, a third apertured part connected to move with said implement member, means on said frame means providing an aperture with which the aperture in said third part registers when said power device acts through said stop means and second part to shift the first part and said implement member into one position, and pin means insertable in said second set of registering apertures for locking said implement member in said one position.

16. The invention set forth in claim 15, further characterized by the same pin means being insertable in either of said sets of registering apertures.

17. A ram mounting for an implement of the type that is adapted to be connected with a tractor having a double-acting hydraulic ram for operating a part on the implement, said ram mounting comprising a first member adapted to be swingably mounted on said implement and operatively connected with said implement part, a second member swingable toward and away from said first member, means for connecting said ram to said second member, stop means acting between said members for limiting relative movement therebetween in one direction, whereby operation of said double-acting hydraulic ram in the corresponding direction acts to shift said implement part in one direction, said first and second members having openings adapted to be brought into registry when said members are in a position in which said stop means limits relative movement therebetween in said one direction, and a locking part insertable in said openings when in registry for locking said members together whereby operation of said ram in the other direction acts through said members and said locking part to shift said implement part in the other direction.

18. In an agricultural implement including frame means, an implement member shiftable relative thereto from one position to another, and a double-acting power unit for shifting said implement member: the improvement which includes control means for said shiftable implement member, comprising a movable member adapted to be connected with said implement member for movement relative thereto, said power unit having a first detachable means for connecting one end of said power unit with said movable member and a second detachable means for connecting the other end with said frame means, stop means adapted to act between said shiftable imp'ement member and said movable member to prevent relative movement therebetween in one direction and thereby taking the reaction of said power unit, whereby operation of the latter in said one direction acts through the movable member and against said stop means for shifting said implement member to one position, means providing a pair of apertures, one in the movable member and the other in the shiftable implement member, adapted to be brought into registry when said movable member is in a position relative to said shiftable implement member to act through said stop means to transmit movement in said one direction to said shiftable implement member, and a detachable part freely insertable through said apertures when in registry for locking said movable member against movement in the other direction relative to said shiftable implement member, whereby operation of said power unit in said other direction acts through said detachable part and movable member for moving said shiftable implement member away from said one position.

WALTER H. SILVER.
JOHN I. CANTRAL.

REFERENCES CITED

The following references are of record in the file of this patent:

UNITED STATES PATENTS

| Number | Name | Date |
|---|---|---|
| 1,969,684 | Bird | Aug. 7, 1934 |
| 2,324,840 | Hipple | July 20, 1943 |
| 2,330,304 | Mott | Sept. 28, 1943 |
| 2,344,123 | Brown et al. | Mar. 14, 1944 |

FOREIGN PATENTS

| Number | Country | Date |
|---|---|---|
| 30,088 | Sweden | Jan. 7, 1911 |
| 38,550 | France | Mar. 16, 1931 |
| | Addition to 687,212 | |
| 378,642 | Germany | July 23, 1923 |